UNITED STATES PATENT OFFICE.

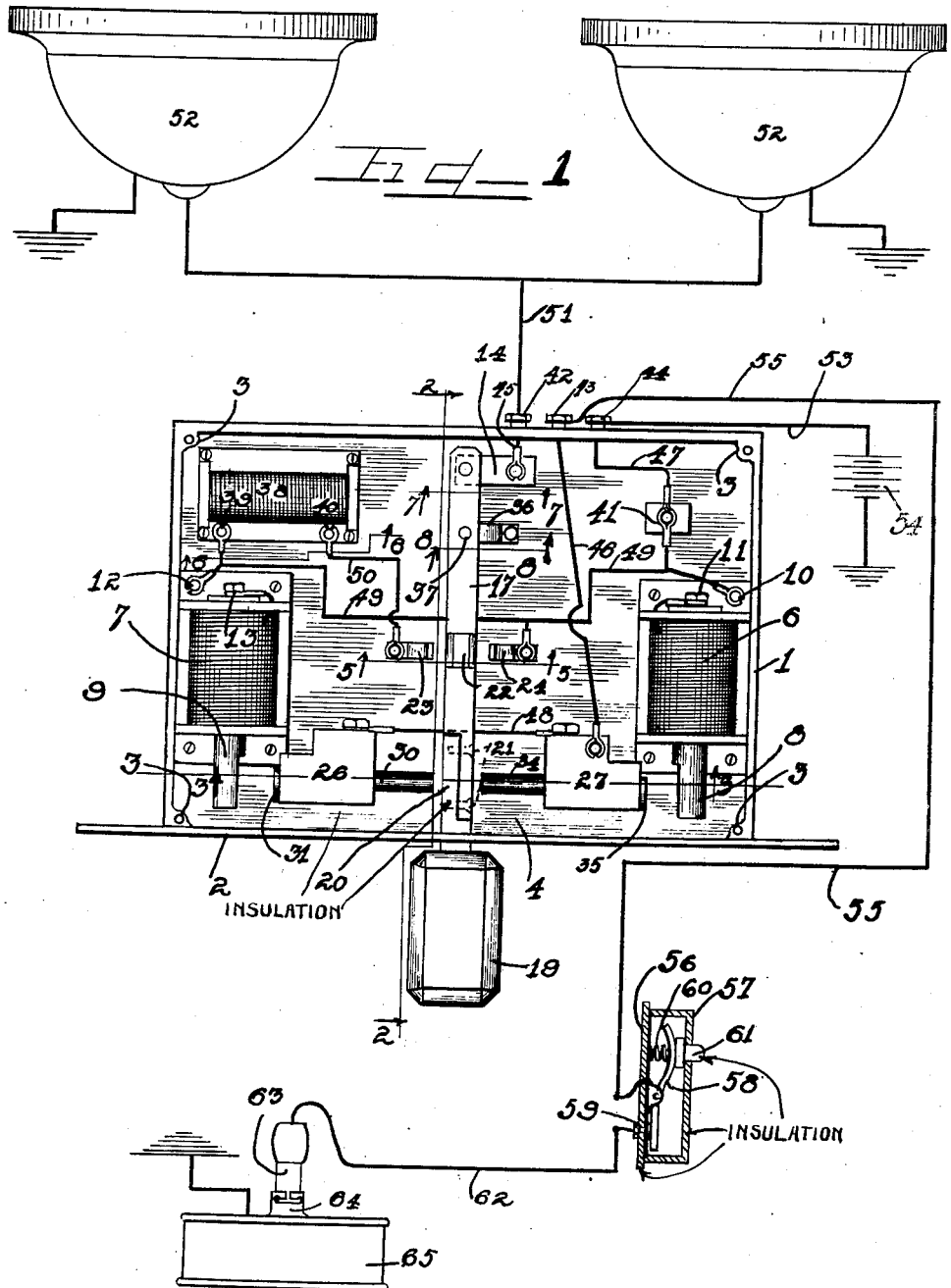

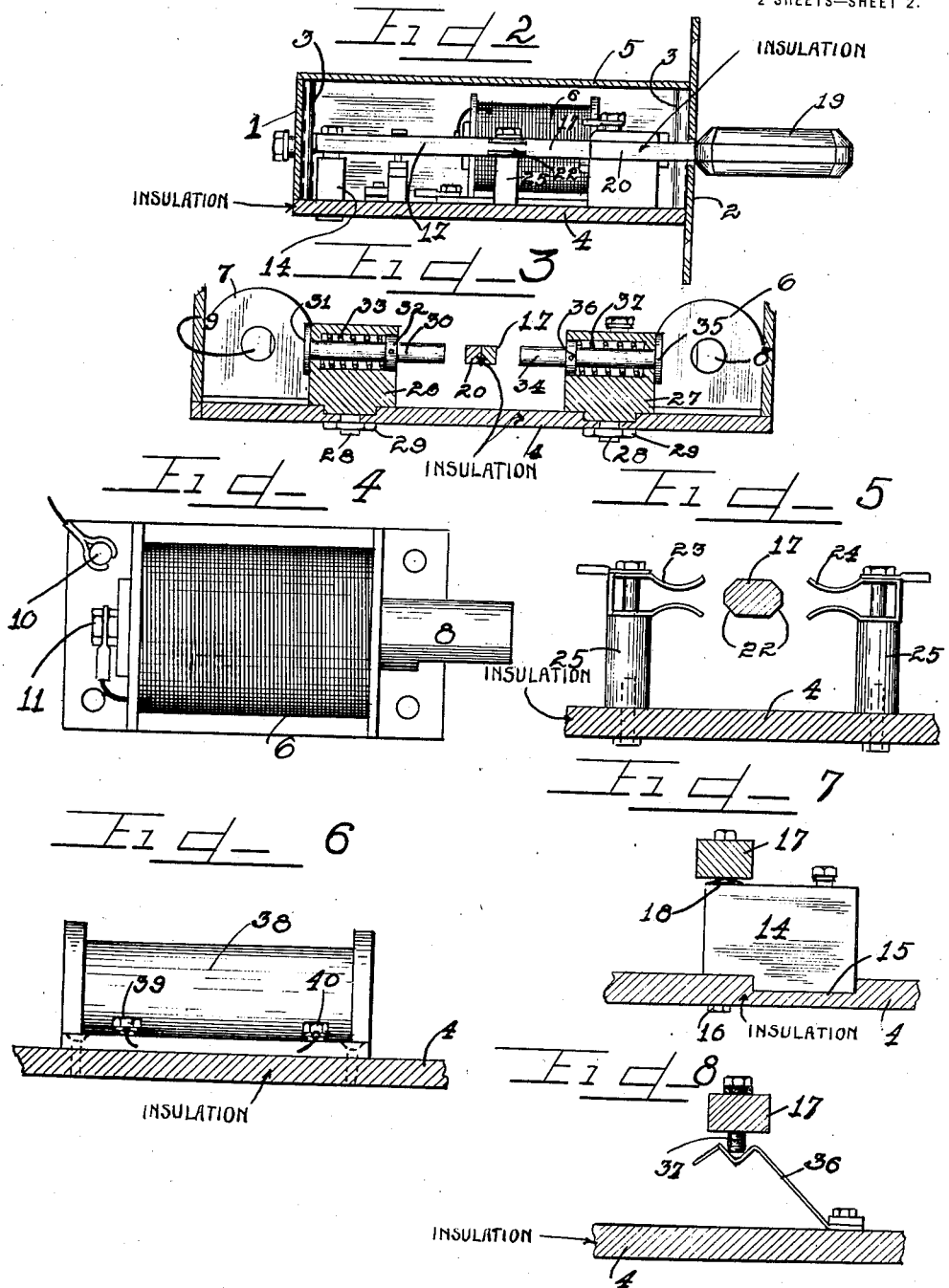

THEODORE STAEHLE, OF CHICAGO, ILLINOIS.

ELECTRIC SWITCH.

1,326,301.  Specification of Letters Patent. Patented Dec. 30, 1919.

Application filed March 16, 1917. Serial No. 155,181.

*To all whom it may concern:*

Be it known that I, THEODORE STAEHLE, a citizen of the United States, and a resident of the city of Chicago, in the county of Cook and State of Illinois, have invented certain new and useful Improvements in Electric Switches; and I do hereby declare that the following is a full, clear, and exact description of the same, reference being had to the accompanying drawings, and to the numerals of reference marked thereon, which form a part of this specification.

This invention relates to a switch mechanism particularly adapted for use upon motor cars, though, of course, adapted for many other uses. By the switch embodying the principles of my invention the tail and head lights of a motor car may be simultaneously illuminated by movement of the switch handle to closed position, yet only the head lights may be switched off by actuation of the switch handle, thus necessitating operation of an auxiliary switch for breaking the circuit to the tail lamp. My invention has been designed for use in compliance with city ordinances and laws in other localities wherein vehicles are not permitted to be equipped with a switch device of any kind, permitting the rear signal or tail lamp of the vehicle to be extinguished from within the vehicle.

Many vehicles in compliance with the law, are equipped with an exterior switch which necessitates stopping the vehicle for operation to illuminate or extinguish the rear signal lamp.

Some devices have been designed heretofore permitting the tail lamp to be switched on from the interior of the vehicle, yet necessitating operation of an exterior switch on the vehicle to extinguish the tail lamp. The difficulty with such types of switches is that in the event of the rear signal circuit being damaged or the tail lamp burning out, the occupants of the car have no knowledge thereof, and become liable to arrest for operating the vehicle without a proper illuminated rear signal. As a consequence an interior light or tell-tale lamp is sometimes mounted within the vehicle connected in series with the tail lamp so that in the event of the tail lamp becoming extinguished, the circuit is broken to the tell-tale lamp within the vehicle, thus notifying the driver that the rear signal is not illuminated. However, such systems are not strictly in compliance with the law to the effect that the rear signal may only be controlled for extinguishment from the exterior of the vehicle. This is for the reason that, by removing the tell-tale lamp bulb from its socket, or breaking the same, the tail lamp may be extinguished from the interior of the car.

It is an object therefore of this invention to provide a switch mechanism for illumination of the tail lamp from the interior of the car or vehicle yet necessitating operation of a switch on the exterior of the car to extinguish the tail lamp, and with the switch mechanism also controlling the circuits to the headlights so that in the event of failure of the rear signal to burn, the headlights are extinguished, thus notifying the occupants of the car that the rear signal is not illuminated.

It is also an object of this invention to construct a switch mechanism controlling the circuits to the tail signal lamp and headlights of a car whereby illumination of the headlights of a car automatically closes the circuit to the rear signal and yet opening of the switch mechanism for extinguishment of the headlights does not open the circuit to the rear signal until a normally closed auxiliary switch is opened.

It is also an object of this invention to construct a vehicle switch mechanism for illumination of a rear signal and for control of the bright or dim illumination of the headlights whereby the circuit to the headlights may be opened without permitting the circuit to the rear signal to be opened by said switch mechanism which initially closes the circuit.

It is also an object of this invention to construct a control switch mechanism by which the headlights of a vehicle may be illuminated either dim or bright, or extinguished and with the circuit to the tail light or rear signal connected into said switch mechanism and adapted to be closed to illuminate the rear signal whenever the headlights are illuminated yet permitting the rear signal to be extinguished thereafter only by actuation of an auxiliary switch mounted on the exterior of the vehicle.

It is furthermore an important object of the invention to construct a switch mechanism for controlling the illumination of the headlights and rear signal of a vehicle permitting the headlights to be illuminated or turned off by said switch mechanism, yet permitting the tail signal to be extinguished only by actuation of an auxiliary switch mounted on the exterior of the vehicle and with the headlights utilized as a tell-tale for the switch mechanism when operating automatically to break the circuit to the headlights in the event of the rear signal becoming extinguished to indicate that the rear signal is not illuminated.

Other and further important objects of this invention will be evident from the disclosure in the drawings and specification.

The invention (in a preferred form) is illustrated in the drawings and hereinafter more fully described.

On the drawings:

Figure 1 is an interior top plan view of the switch mechanism with the cover plate removed, showing the same connected, diagrammatically, to the head and tail lights of a vehicle.

Fig. 2 is a detail section on line 2—2 of Fig. 1.

Fig. 3 is a fragmentary detail section taken on line 3—3 of Fig. 1.

Fig. 4 is an enlarged top plan view of one of the solenoid coils.

Fig. 5 is a sectional detail on line 5—5 of Fig. 1.

Fig. 6 is a sectional detail on line 6—6 of Fig. 1.

Fig. 7 is a detail section on line 7—7 of Fig. 1.

Fig. 8 is a detail section on line 8—8 of Fig. 1.

As shown on the drawings:

The reference numeral one indicates a rectangular frame of a switch casing having a front attaching plate 2, which extends above and below the frame and beyond the ends thereof, as clearly shown in Figs. 1, and 2. Formed at the four corners at the interior of said frame member are webs 3, serving as a means for attachment to the frame of an insulation base plate 4, and a top or cover plate 5. Within the casing thus formed, are two solenoids 6 and 7, respectively, which are the same in construction, the one provided with a core 8, extending beyond one end of the coil 6, and the other provided with a core 9, extending beyond the end of the coil 7, and with each of said respective cores 8 and 9, having one side surface at one end thereof, flattened, as shown clearly in Figs. 1 and 3. One terminal of the solenoid coil 6, is denoted by the reference numeral 10, and the other end of the coil wire thereof is led outwardly and connected on the end of the core 8, by a terminal post 11. Similarly, on the solenoid 7, one terminal is denoted by the reference numeral 12, and the other terminal is mounted on the core and denoted by the reference numeral 13.

Mounted in upright position at the rear of the casing on the base plate 4, is a metal pivot block 14, having a projection 15, on the under surface thereof which extends into a recess provided therefor in the base plate, as shown clearly in Fig. 7, to anchor said pivot block from movement, and having suitable attaching means, such as a screw or bolt 16, engaged through the base plate and into said block to secure the same. Said attaching bolt 16, extends upwardly through the pivot block 14, through the upper end thereof and affords a pivot connection for a long switch bar 17 with a spring washer 18 engaged around said bolt between said switch bar and said pivot block 14, to insure good electrical contact therebetween.

The switch bar 17, extends forwardly through the casing and through a horizontal slot in the front plate 2, and on its end exterior of the casing is provided with an insulation handle 19, provided with an insulation extension 20, which fits into a cut away portion of the end of the switch bar 17, and is held attached by means of screws 21. Near its middle portion, said switch bar 17, is chamfered off on each side for a short distance therealong, as shown in Figs. 1 and 5, and denoted by the reference numeral 22, and mounted on each side of said switch bar substantially in line with the chamfered portion 22, are resilient jaw contact members 23 and 24, respectively, each mounted upon an upright post 25, as shown in detail in Fig. 5, both of which are secured upon the insulation plate 4.

Mounted at the forward end within the casing, one on each side of the switch bar 17, are metal casing members 26 and 27, respectively, each having a projection on the under surface which fits into a recess in the base plate 4, as clearly shown in detail in Fig. 3, to anchor the casing in position, and with a threaded stud extension 28, on each thereof extending through said base plate and engaged by a nut 29, to hold said respective casing members securely in position.

As clearly shown in detail in Fig. 3, each of said casing members 26 and 27, is cored out on its interior. Slidably mounted through the member 26, is a rod 30, having an enlarged head 31, on one end thereof, and with a collar 32, secured near the middle portion of the rod adapted to register with the end wall of the casing when the rod is in its inner position, shown in Fig. 3. A spring 33, is coiled about said rod 30, and disposed within the casing, bearing at one end against the casing and at the other end against said collar 32, and operating normally to resist movement of the rod 30, whereby the head 31, is thrust outwardly away from the casing. Similarly, mounted in the casing member 27, is a rod 34, provided with a head 35, and a collar 36, with a spring 37, coiled around the rod to resist movement of the head 35, away from the casing. The inner ends of each of said rods 30 and 34, are disposed in position to be contacted by the switch bar when swung either to the right or left, as the case may be. However, when the switch bar is swung to the left, the insulation portion 20, strikes the bar 30, so that no electrical circuit is set up between the switch bar and the bar 30. Said respective heads 31 and 35, when thrust outwardly, due to movement of the switch bar, contact the flattened portions of the respective solenoid cores 8 and 9, and thereafter are held in contact therewith against the stress of their respective springs by the magnetic attraction of the solenoid cores, due to closure of a circuit through the solenoid, as hereinafter described.

A resilient notched member 36, is secured upon the base plate 4, with the recessed portion thereof centrally disposed beneath the switch bar 17, when in central or off position, and a pin 37, is engaged through said switch bar adapted to latch in said notched member to hold said switch bar in central or off position against accidental adjustment.

Attached upon the base plate 4, at one corner of the casing is a dimmer resistance coil 38, provided with terminals 39 and 40, respectively. A terminal post 41, is mounted upon the base plate 4, in the opposite corner of the casing, and attached upon the exterior rear wall of the frame member 1, of the casing, are terminal posts 42, 43 and 44, respectively. Within the casing, the terminal 42, is connected to the block 14, by a wire 45 and the terminal 43, is connected to the casing member 27, by a wire 46. The terminal member 44, is connected to the terminal post 41, by a wire 47, and the two casing members 26 and 27, are connected to one another by a wire 48. Leading from the terminal post 41, is a main line wire 49, provided with a number of branches, one connected to the terminal 10, of the solenoid 6, another to the switch terminal 24, another branch connected to the terminal 12, of the solenoid 7, and another branch connected to the terminal post 39, of the dimmer resistance coil 38. A wire 50, is connected to the other terminal 40, of the dimmer resistance coil, and to the switch contact member 23. Also connected to the exterior terminal post 42, is a wire 51, which divides into two branches, each of which is connected to one of two headlights 52, the other terminal of each of said headlights being grounded. Connected to the terminal post 44, is a wire 53, which leads to a battery or any other source of E. M. F. 54, the other terminal of which is grounded. Connected to the terminal 43, is a wire 55, which leads to a normally closed and automatically closing switch member which, when the installation is made, is mounted on the exterior of the vehicle.

Said automatic switch consists of an insulation base 56, with a cover casing 57, and pivotally mounted upon said base within the casing is a switch arm 58, to which the wire 55, is connected through the pivot mounting therefor. Said switch arm 58, is normally impelled into contact with a terminal member 59, by a coil spring 60, and a push button 61, slidably mounted through the cover of the casing is disposed in position to depress said switch arm 58, to break contact thereof with the terminal 59. Connected to the terminal 59, is a wire 62, which leads to and is connected to a plug 63, forming a part of a bayonet plug switch connection 64, on a tail lamp casing 65. The other terminal of the tail lamp is grounded. As clearly shown in Fig. 1, the bayonet switch connection 64, which is of a conventional type, permits two positions of the plug 63, one for closed and the other for open circuit to the lamp within the casing 65.

The operation is as follows:

If it is desired to illuminate the headlights and rear signal on the vehicle, the switch handle 19, is thrust to the left thereby causing the switch bar 17, at its chamfered portion 22, to engage with the resilient switch contact 23. The insulation portion 20, of said switch bar, strikes the rod 30, sliding the same through its casing 26, to bring the head 31, of said rod, into contact with the solenoid core 9, of the solenoid 7. When the switch bar closes with the switch contact 23, a circuit is set up from the battery 54, through wire 53, wire 47, terminal 41, wire 49, terminal 39, resistance coil 38, terminal 40, wire 50, switch contact 23, switch bar 17, pivot block 14, wire 45, terminal post 42, wire 51, to headlights 52, and thence to ground returning to battery 54, and causing a dimmed illumination of the headlights 52. Furthermore, movement of the head 31, of the rod 30, into contact with the solenoid core 9, closes the circuit from the battery 54, through wire 53, wire 47, terminal 41, wire 49, terminal 12, of solenoid coil 7, through coil to terminal 13, on the solenoid core 9, through solenoid core 9, and rod 30, to casing member 26, through wire 48, to casing member 27, wire 46, terminal 43, thence by wire 55, through closed automatic switch and by wire 62, to grounded tail light 65, to illuminate the same.

If the switch bar 17, is swung into central or off position, contact with the switch member 23, will be broken by the rod 17, and the circuit to the headlights 52, will be opened. However, although the switch bar 17, is moved back into central position, the rod 30, is held against the solenoid core 9, by magnetic attraction, and as a consequence, the circuit from the battery to the tail light 65, is still closed, and the tail light illuminated.

In order to extinguish the tail lamp 65, it is necessary to step out of the vehicle, and depress the button 61, on the exterior switch to momentarily break the circuit to the tail light, thereby breaking the circuit through the solenoid 7, and deënergizing the same so that the spring within the casing 26, returns the rod 30, to normal position, that is, out of contact with the solenoid core 9. Consequently, when the push button 61, is released, and the automatic auxiliary switch closes, the tail light circuit is still broken due to the fact that the rod 30, is out of contact with the solenoid core 9.

The same operation takes place when the switch bar 17 is swung to the right, the tail light circuit being closed through the solenoid core 8, and slidable rod 34, and the headlights 52, being illuminated by a circuit closed, due to movement of the switch bar 17, into contact with the switch member 24. This circuit causes a bright illumination of the headlights, inasmuch as the dimmer resistance 38, is not in circuit. Specifically, this circuit is from the battery 54, wire 53, wire 47, wire 49, switch contact 24, switch bar 17, wire 45, wire 51, to headlights 52, and thence by ground to battery 54. The tail light circuit is the same as before described, except that a branch of the main line wire 49, supplies current to the terminal 10, of the solenoid 6, through the coil thereof, to the core 8, of the solenoid, thence through rod 34, and casing 27, to wire 46, and by wires 55 and 62, through the closed automatic switch to tail light 65. As in the instance previously described, if the switch bar 17, is returned to central or off position, the bar 34, will be held in contact with the solenoid core 8, by magnetic attraction, and the tail light may only be extinguished by momentarily breaking the circuit by actuating the push button 61, on the exterior of the vehicle, thereby deënergizing the solenoid 6, and causing release of the rod 34, which is returned to normal position by its spring 36.

The switch mechanism operates automatically to break the circuit to the headlights in the event of the tail light burning out or other injury to the tail light circuit, causing extinguishment of the tail lamp. For instance, if the switch bar 17, is swung to the left position to close the circuit to the headlights through the dimmer resistance coil 38, the switch arm will be in contact with the end of the rod 30, which will be held against the stress of its spring in contact with the solenoid core 9, by magnetic attraction. Consequently, in the event the tail light circuit is broken the solenoid 7, will be deënergized and the spring 33, within the casing 26, will serve to return the rod 30, to normal position, thereby thrusting the switch bar 17, back to central or off position and out of contact with the switch member 23. A similar operation, of course, will take place in the event of failure of the tail lamp circuit when the switch bar is moved to the right to close the circuit to the headlights through the switch member 24, in this instance, the rod 34, serving to return the switch bar to central or normal position.

When the switch bar is in central or off position it is held from accidental adjustment by the resilient detent member 36, shown in detail in Fig. 8, co-acting with the screw bolt 37, engaged through the switch bar.

I have found that the magnetic effect of the solenoids, when the tail light circuit is closed, may be used to hold the main switch bar 17, in either one of its adjusted positions. This is due to the fact that the small rod 30, or 34, as the case may be, when moved into contact with the energized solenoid cores likewise become magnetized and exert a magnetic effect upon the switch bar 17, to hold the same in its adjusted position, and in the event of deënergization of the solenoids, due to opening of the tail light circuit, of course, the main switch bar 17, is released from the magnetic holding effect and may be easily returned to central or off position. The magnetic effect of either of the rods 30 or 34, on the switch bar 17, may serve to hold the switch bar in closed contact with either one of the switch members 23' or 24, against spring tension if so desired although, I have shown the members as a type to grip said bar when moved into a closed circuit therewith.

I am aware that various details of construction may be varied through a wide range without departing from the principles of this invention, and I therefore do not purpose limiting the patent granted otherwise than necessitated by the prior art.

I claim as my invention:

1. In a switch mechanism of the class described for use in combination with the tail and headlights of a vehicle comprising means to close one of two circuits to the headlights for bright or dim illumination thereof and manually retractable to break the circuit to the headlights, and a slidable mechanism operated by said means to close the circuit to the tail light, said mechanism held in closed position by a magnetic effect irrespective of subsequent adjustments of said means for bright or dim illumination of the headlights to maintain the tail light circuit closed.

2. A switch mechanism of the class described for use in combination with the tail and headlights of a vehicle comprising means to close a circuit to the headlights and manually retractable to break the circuit to the headlights, slidable mechanism operated by said means to close the circuit to the tail light, said mechanism held in closed position by a magnetic effect irrespective of subsequent adjustments of said means to maintain the tail light circuit closed, and an auxiliary automatically acting normally closed switch in the tail light circuit to break said circuit for extinguishment of the tail light, thereby releasing said mechanism to permit the same to act automatically to return said means to normal open circuit position.

3. The combination with the headlights and tail light of a vehicle, of a switch mechanism for closing the circuit for illuminating the headlights and tail light, and means operating automatically to return said switch mechanism to initial position to break the circuit to said headlights in the event of opening of the tail light circuit after closure thereof.

4. The combination with the headlights and tail lamp of a vehicle, of a switch mechanism connected to close a circuit to the headlights and manually actuable to open said circuit for extinguishment of the headlights, slidable spring controlled means operated by said switch mechanism into closed position to close a circuit to the tail lamp, magnetic devices energized by closure of the tail lamp circuit for retaining said slidable means in closed circuit position irrespective of movement of said switch mechanism to maintain the tail lamp illuminated, and mechanism operable to break the circuit to the tail light and to said magnetic devices to cause release of said means to permit the same to automatically return said switch mechanism to initial position.

5. The combination with the headlights and tail light of a vehicle, of a switch mechanism comprising means operating to close a circuit simultaneously to said headlights and tail light, and mechanism operating automatically to return said means to initial position to extinguish the headlights in the event of opening of the circuit to the tail light.

6. In a device of the class described the combination with a signal lamp of a tell-tale circuit, a switch mechanism when moved into closed position closing the circuit to said lamp and to said tell-tale circuit, means maintaining the circuit closed through said signal lamp when the tell-tale circuit is opened, means opening said tell-tale circuit when said signal lamp circuit is opened, and means adapted to maintain the tell-tale circuit closed when said signal lamp circuit is closed.

7. In a switch mechanism of the class described, a switch member, a contact adapted to be closed thereby, a magnetic device in parallel circuit with said contact, means operated by said member into contact with said device to close a circuit through said device and energize the same to hold said means in contact therewith irrespective of movement of said switch member, and an auxiliary device for breaking the circuit momentarily to said device to deënergize the same to cause said means to act automatically to return said switch member to initial open circuit position.

8. The combination with the headlights and tail light of a vehicle, of a switch mechanism comprising means operating by one movement to close a circuit through said headlights and tail light, mechanism for maintaining the tail light circuit closed when said means is returned to initial position to extinguish the headlights, and means operating automatically to return said means to initial position to extinguish the headlights in the event of opening of the tail light circuit.

9. A switch comprising a pivoted switch bar, a plurality of switch contacts either one adapted to be closed thereby, a resistance coil in circuit with one of said switch circuits, a plurality of solenoids, and a plurality of slide bars movable against spring stress, either adapted to be moved by said switch bar against a solenoid to close a circuit through the solenoid to retain the slide bar in contact therewith by magnetic attraction irrespective of return of said switch bar to initial position.

10. The combination with the headlights and tail light of a vehicle, of a switch mechanism, and a source of E. M. F. interconnected therewith, means operable in said switch mechanism to close the circuit to said headlights and simultaneously to said tail light to illuminate the same, said means retractable to open the circuit to the headlights without opening the circuit to the tail light, and mechanism forming a part of the tail light circuit operating to throw said means into open circuit position to break the circuit to said headlights in the event of opening of the circuit to the tail light.

11. The combination with the headlights and tail light of a vehicle, of a main switch mechanism mounted on the interior of the vehicle, and a normally closed automatically closing auxiliary switch connected on the exterior of the vehicle in the tail light circuit, a plurality of switch contacts within said main switch, and means adapted to close the same simultaneously and maintain the same closed to close the circuit to the headlights and to the tail light, said means manually retractable to break the headlight circuit without breaking the circuit to the tail light and automatically retractable to break the circuit to the headlights when the tail light circuit is broken.

12. A switch comprising a switch bar, a pair of switch contacts either one adapted to be closed thereby, a resistance coil in series with one of said contacts, a solenoid in circuit with each of said contacts, spring resisted slide rods, one for each of said solenoids adapted to be moved into contact therewith to close the circuit therethrough and to be held in contact by the magnetism of the solenoid and each actuable by said switch bar into contact position, wiring connections within said switch to maintain a solenoid energized when a switch contact is opened by said switch bar, and mechanism for breaking the circuit through said solenoids to release the spring thrust contact rods and open the circuits to the solenoids.

13. A switch comprising a casing, an insulation base plate forming a part thereof, switch contacts mounted on said base plate, a switch bar pivoted within said casing adapted to close with either of said contacts, a resistance coil connected with one of said contacts, a terminal post on the exterior of the casing in circuit with said switch bar, another terminal post on the exterior of the casing adapted to receive a line wire from a source of E. M. F. connected thereto, a pair of solenoids within said casing, one in circuit with each of said switch contacts, a wire connecting said line wire terminal post with one of said contacts and with said resistance coil, a pair of slide bars adapted to be moved by said switch arm, one mounted on each side thereof, springs resisting movement of said slide rods, each thereof adapted when moved to an extreme position by said switch arm to be thrust into contact with the solenoid to close a circuit therethrough, and a binding post on the exterior of the casing connected electrically with said slide rods.

14. The combination with the headlights and tail light of a vehicle, of a switch bar adapted to be operated to close circuits through said headlights and tail light, mechanism for maintaining the tail light circuit closed when said switch bar is returned to initial position to extinguish the headlights, a normally closed manually actuable switch device in said tail light circuit, and means operating automatically to return said switch bar to initial position to extinguish the headlights when said switch device is opened.

15. In a switch device the combination with the headlight and the tail light circuits of a vehicle, of means for simultaneously closing both of said circuits and adapted to be released to open one of said circuits only, mechanism holding said means in closed circuit position, and mechanism impelling said means into open circuit position when the tail light circuit is broken.

16. The combination with a vehicle headlight circuit and a tail light circuit, of switch means adapted to be moved to close both of said circuits, and means acting automatically when the tail light circuit is opened for returning said switch means to initial position to open the headlight circuit.

In testimony whereof I have hereunto subscribed my name in the presence of two subscribing witnesses.

THEODORE STAEHLE.

Witnesses:
LE ROY D. KILEY,
EARL M. HARDINE.